C. H. HILL.
WIRELESS CONTROLLED FLYING TORPEDO.
APPLICATION FILED JUNE 29, 1917.

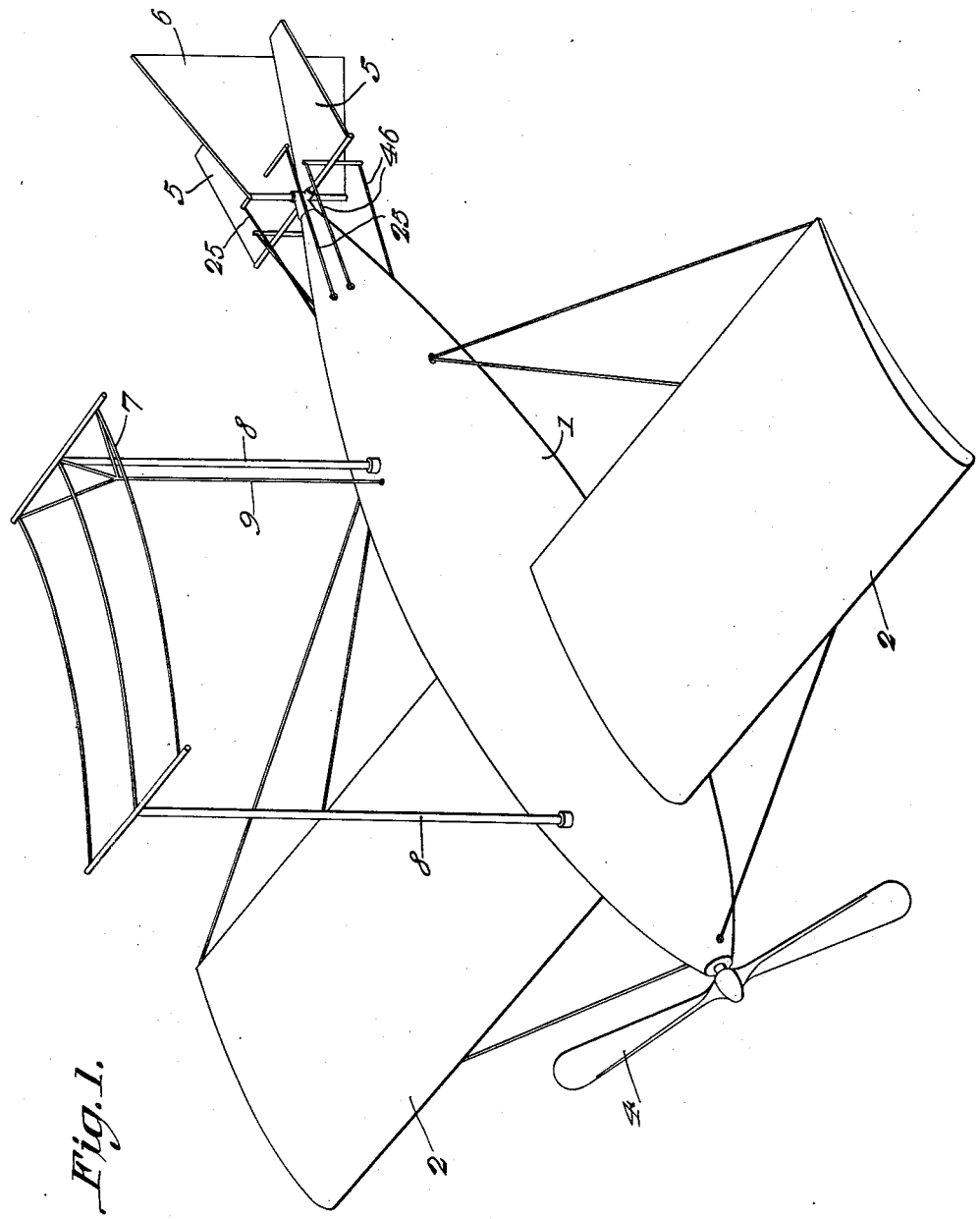

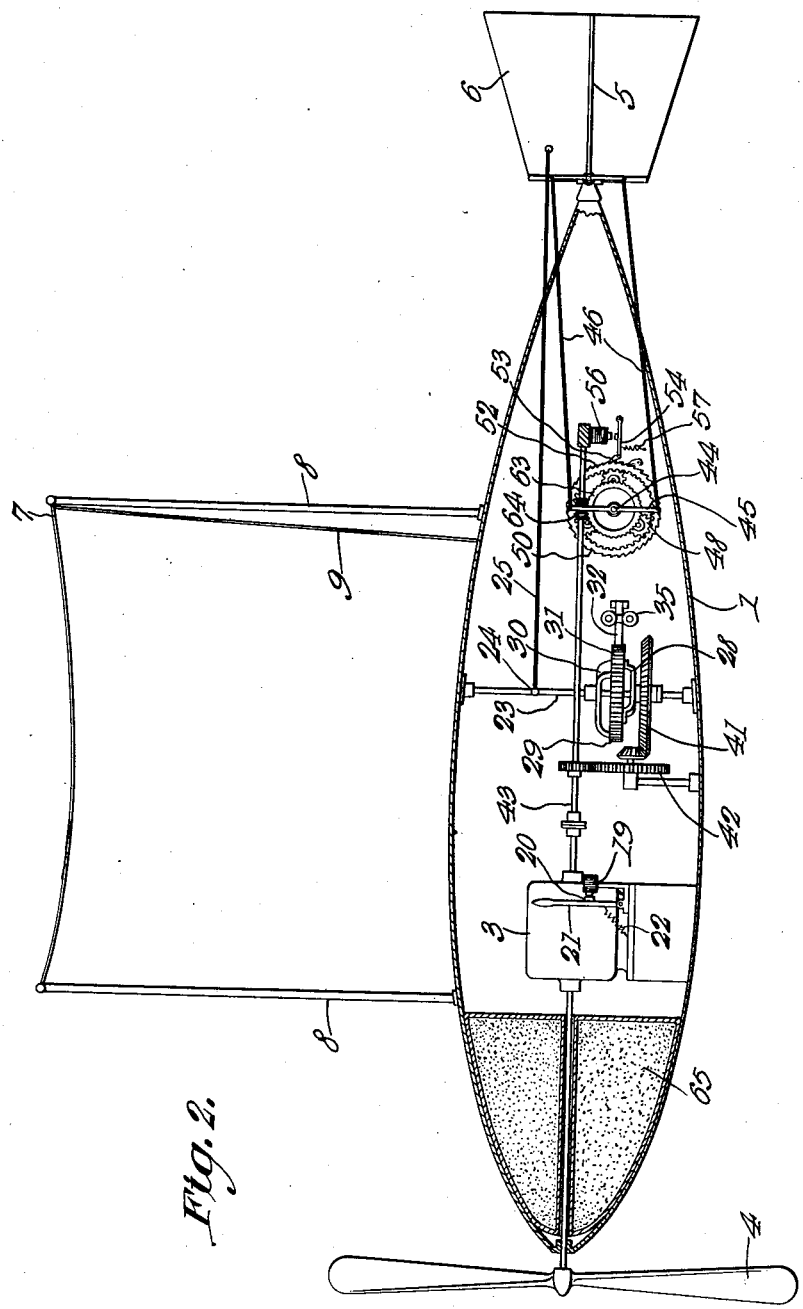

1,304,314.

Patented May 20, 1919
5 SHEETS—SHEET 3.

Witnesses

C. H. Hill  Inventor by C. A. Snow & Co.
Attorneys

C. H. HILL.
WIRELESS CONTROLLED FLYING TORPEDO.
APPLICATION FILED JUNE 29, 1917.
1,304,314.
Patented May 20, 1919.
5 SHEETS—SHEET 4.
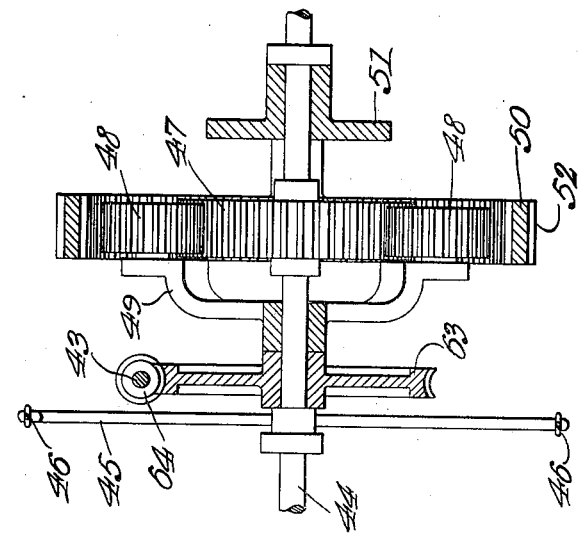
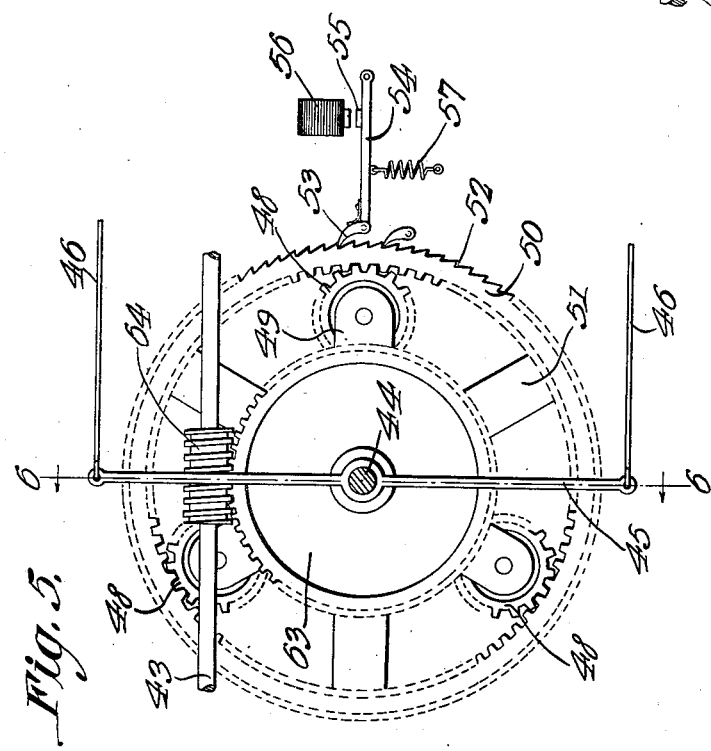
Witnesses
C. H. Hill   Inventor
by   Attorneys

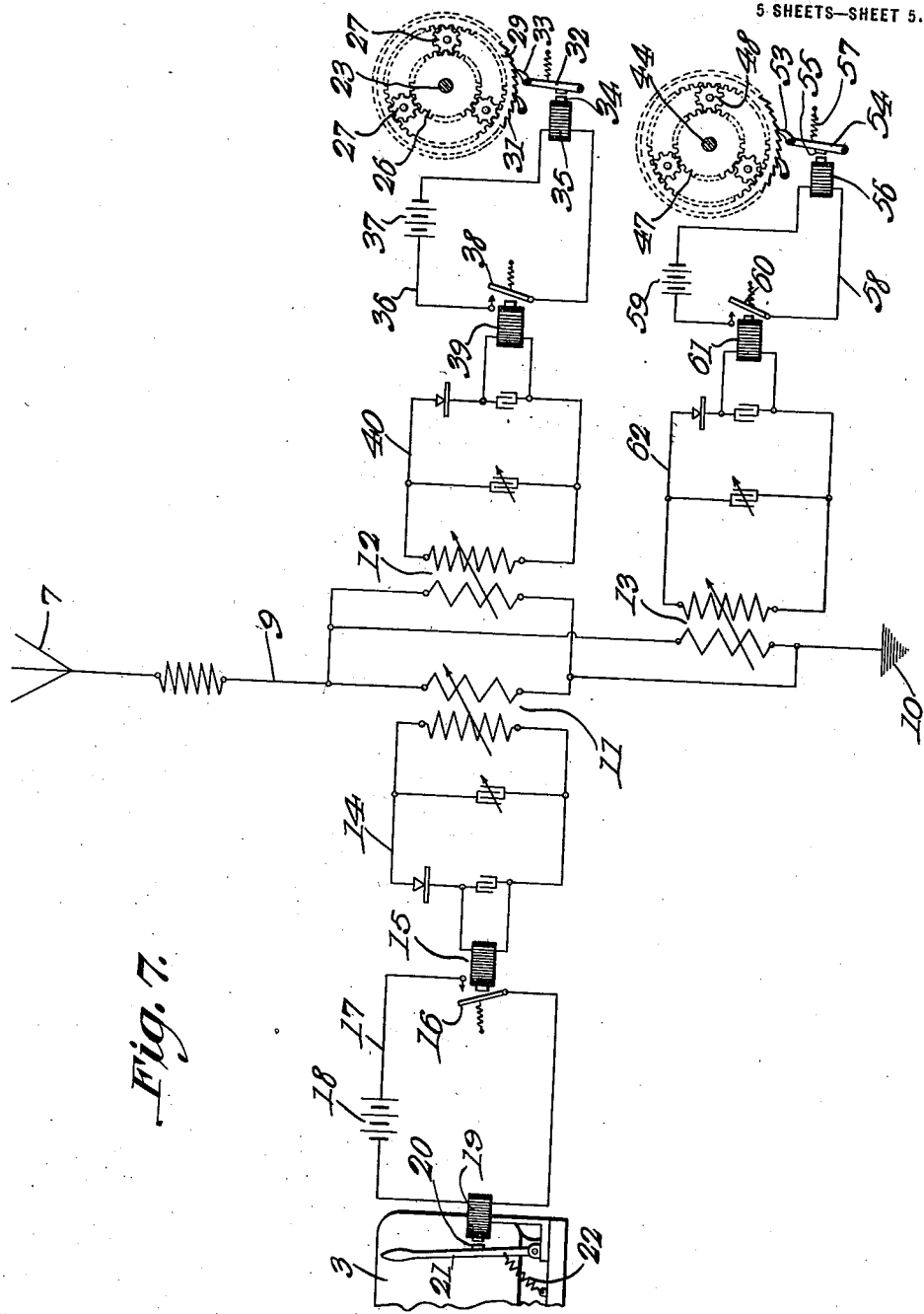

UNITED STATES PATENT OFFICE.

CLAUDE H. HILL, OF QUINCY, ILLINOIS.

WIRELESS-CONTROLLED FLYING-TORPEDO.

1,304,314.  Specification of Letters Patent.  Patented May 20, 1919.

Application filed June 29, 1917. Serial No. 177,828.

*To all whom it may concern:*

Be it known that I, CLAUDE H. HILL, a citizen of the United States, residing at Quincy, in the county of Adams and State of Illinois, have invented a new and useful Wireless-Controlled Flying-Torpedo, of which the following is a specification.

The present invention relates to an aerial torpedo, and aims to provide a novel and improved flying torpedo controlled by Hertzian waves.

It is the object of the invention to provide a wireless controlled flying torpedo having a propelling and steering means under the control of a sending station, whereby the torpedo of a sending station can be directed at will through the air to the desired point to strike the object intended, or drop onto the object to accomplish its destruction.

This device is intended for offensive or defensive warfare, the torpedo being under the control of a wireless sending station in order to direct it to the desired point under observation, and the construction and operation being such that the course of operation of the torpedo is not apt to be interfered with, the control being such that it cannot be taken away by an enemy sending station.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:

Figure 1 is a perspective view of the torpedo.

Fig. 2 is a side elevation thereof, portions being broken away to show the interior parts.

Fig. 5 is a side elevation of the operating device for the horizontal rudder.

Fig. 6 is a section on the line 6—6 of Fig. 5.

Fig. 7 is a diagrammatical view of the wireless equipment of the torpedo to control the operating means.

Figure 4:
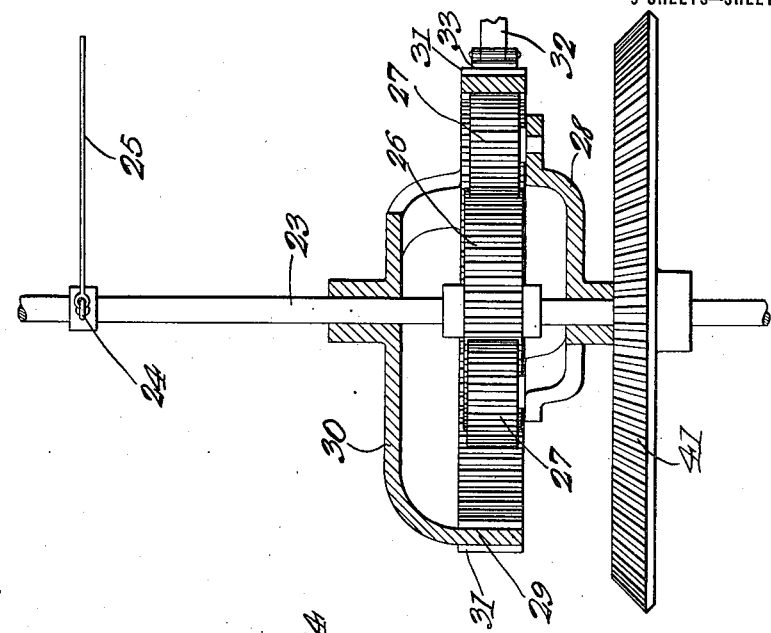
Fig. 4 is a section on the line 4—4 of Fig. 3.

The torpedo has a suitable shell or hull 1 within which is a suitable frame, and outstanding wings 2 are attached to said shell for sustaining the torpedo in flight, a suitable motor 3 being mounted within the shell for operating the helix or propeller 4 to propel the torpedo in the air. This motor 3 may be an electric motor, a gasolene engine or motor, a compressed air motor, or the like, as may be found most desirable. The torpedo is provided at the rear end of the shell or body 1 with a horizontal rudder 5 hinged thereto, and with a vertical rudder 6 also hinged thereto, for steering the torpedo.

In order to control the torpedo by the Hertzian waves, the antennæ or aerial 7 is supported by masts 8 carried by the shell to space the antennæ a suitable distance above said shell, the latter serving as a ground connection for the aerial or antennæ conductor 9 connected at its upper end to the antennæ and having its lower end grounded, as at 10, to the frame or shell of the torpedo. This conductor 9 has interposed therein the primary windings of the tuning coils 11, 12 and 13, which are preferably connected in parallel, although the primary windings of the several tuning coils may be united into one with which the secondary windings are associated inductively.

The tuning coil 11 controls the operation of the motor 3, the secondary winding of the coil 11 being disposed in a suitable receiving circuit 14, shown in simple form in Fig. 7, and this circuit 14 has a relay magnet 15 therein controlling an armature switch 16 of a circuit 17 having battery or other suitable source of electrical energy 18 and also an electro-magnet 19. An armature 20 is carried by the controlling member or lever 21 of the motor to be attracted to and held by the electro-magnet 19, a spring 22 being connected to the controlling member 21 tending to move it away from the electro-magnet and thus stop the motor. The relay magnet 15 is of the "stick" type, whereby a steady stream of oscillations will cause the armature switch 16 to adhere to the magnet 15, thus keeping the circuit 17 closed, and maintaining the electro-magnet 19 energized, whereby to hold the controlling member 21. Consequently, when a steady stream of oscillations of suitable character are impressed on the tuning coil 11, this will maintain the armature switch 16 in closed position, whereby the controlling member 21 of the motor is held in operating position, and only upon the interruption of said stream of oscillations is the controlling member 21 released, the armature 16 being first released by the deënergization of the magnet 15, thus opening the circuit 17 and deënergizing the magnet 19 which will release the armature 20, so that the spring 22 will swing the controlling member 21 to stop the motor. As long as the sending station transmits the steady stream of oscillations tuned in accordance with the position of the tuning coil 11, the motor will continue to operate after being started by moving the operating member 21 manually adjacent to the magnet 19, after the oscillations have been started.

Figure 3:
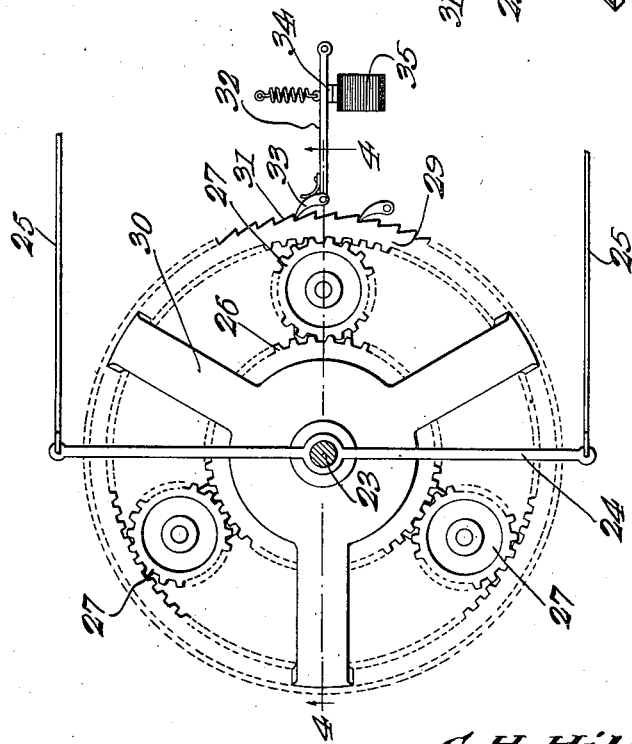
Fig. 3 is a plan view of the operating device for the vertical rudder.

The steering means as well as the propelling means is also controlled by wireless transmission. The operating means of the vertical rudder 6 embodies a shaft 23 journaled within the frame or shell 1 and having a lever 24 secured thereto and connected by cords or flexible elements 25 with the rudder 6, whereby the oscillation of the lever 24 with the shaft will oscillate the rudder for steering the torpedo in its line of flight. A sun gear 26 is secured upon the shaft 23, and has meshed therewith the planetary gears 27 carried by a spider 28 having its hub fitted upon the shaft 23 for rotation. The planetary gears 27 in turn mesh with an internal gear 29 having the spider 30 whose hub is mounted for rotation on the shaft 23. An oscillatory arm 32 is provided with a spring-pressed pawl 33 engaging an annular series of ratchet teeth 31 with which the internal gear 29 is provided, whereby the oscillation of the arm 32 will advance the gear 29 step by step. This arm 32 is oscillated by a spring and the wireless equipment, and is provided with an armature 34 under the influence of an electromagnet 35 in an electrical circuit 36 including the battery 37 or other suitable source of electrical energy and an armature switch 38. This switch 38 is controlled by the relay magnet 39 in the wireless receiving circuit 40 of the secondary winding of the tuning coil 12. Such tuning coil is so adjusted as to select oscillations of predetermined character, whereby only those oscillations are effective to energize the magnet 39 and attract the armature switch 38. These oscillations are transmitted in a continuous interrupted or make-and-break stream, to therefore vibrate the armature switch 38, to make and break the circuit of the magnet 35, and therefore oscillate the arm 32 and advance the internal gear 29 at the desired speed. The set of planetary gears 27 are rotated around the sun gear 26 at a predetermined speed, being driven by the motor 3. Thus, a gear 41 secured to the hub of the spider 28 is connected by a train of gears 42 with a shaft 43 connected to and operated by the motor 3. It will, therefore, be noted, that when the motor is started, the spider 28 will be rotated (in the direction of the arrow in Fig. 3), and the interruptions of the Hertzian oscillations are so timed that the arm 32 is oscillated at the proper speed, to thereby advance the internal gear 29 at such a speed, according to the rolling motion of the gears 27 around the sun gear 26, that the internal gear 29 in moving with the planetary gears 27, will let the sun gear 26 remain stationary. The rudder 6 will, therefore, remain stationary so long as the frequency of the interrupted oscillations is in timed relation with the motor. The operator at the sending station having control of the frequency of interruptions of the oscillations through a suitable sending instrument, can increase or decrease the interruptions whereby the rudder 6 can be swung toward one side or the other, and by observing the course of the torpedo, the operator can control the line of flight thereof accurately. When the frequency of oscillatory interruptions are increased above the predetermined number per unit of time, the internal gear 29 will be rotated faster than its normal speed, and since the planetary gears 27 are rotated at a predetermined speed around the shaft 23, the internal gear 29 in being rotated faster, will give the planetary gears 27 an increased motion, counter clockwise thereof, as seen in Fig. 3, about their axes during their rotation around the sun gear 26, which will result in said sun gear and shaft 23 being rotated clockwise as seen in Fig. 3. This will swing the lever 24 to thereby operate the cords 25 and swing the rudder 6 toward the corresponding side. When the frequency of interruptions is decreased below normal, the speed of the internal gear 29 will be reduced below normal, the spring pressure of the pawl 33 against the teeth 31 serving to retard the internal gear 29, and the slower movement of the gear 29 will result in the planetary gears 27 being rotated slower, as seen in Fig. 3, about their axes, thereby turning said sun gear counter clockwise and swinging the lever 24 in the opposite direction to swing the rudder 6 toward the opposite side. In this manner, when the frequency of interruptions is normal, the rudder 6 will remain in its set position, normally in the longitudinal axis of the body or shell 1, to direct the torpedo straight ahead, and by increasing or decreasing the frequency of interruptions, the rudder will be made to swing toward one side or the other, to steer the torpedo, or maintain it in its course of flight toward the target aimed at.

The operating means and control of the horizontal or elevating rudder 5 is substantially the same as that for the rudder 6. The planetary gearing embodies a rock shaft 44 having the lever 45 connected by cords or flexible elements 46 with the rudder 5 to oscillate said rudder up and down. A sun gear 47 is secured to the rock shaft 44 and planetary gears 48 mesh with the sun gear and are carried by a spider 49 mounted for rotation on the shaft 44. An internal gear 50 meshes with the planetary gears 48 and has a spider 51 whose hub is mounted for rotation on the shaft 44, the internal gears 50 having ratchet teeth 52 upon its periphery. An oscillatory arm 54, similar to the arm 32, has a spring-pressed pawl 53 engaging the ratchet teeth 52, and said arm has an armature 55 under the control of an electro-magnet 56 which acts upon the armature to advance the pawl 53 and internal gear 50. A spring 57 is connected to the arm 54 for retracting the pawl 53. The magnet 56 is disposed in an electrical circuit 58 having the battery 59 or other source of electrical energy, and an armature switch 60 under the control of a relay magnet 61 of the wireless receiving circuit 62 connected to the secondary winding of the tuning coil 13. The planetary gears 48 are rotated with the spider 49 which is operatively connected to the motor, such as by means of a worm wheel 63 secured to the hub of the spider and meshing with a worm 64 secured on the shaft 43. The spider 49, therefore, as well as the spider 28, is rotated at a predetermined velocity, and the tuning coil 13 selects Hertzian oscillations of predetermined quality for vibrating the armature switch 60, resulting in the vibration of the arm 54 of predetermined frequency, in order that the internal gear 50 is rotated at the proper speed to maintain the shaft 44 idle to hold the rudder 5 in one position, the movement of said rudder up or down being accomplished by increasing and decreasing the frequency of interruptions, the same as with the rudder 6. The operator having charge of the sending station for the oscillations controlling the rudder 5, can therefore control the elevation of flight of the torpedo, and when the torpedo reaches the desired point, the rudder 5 can be tilted to turn the nose of the torpedo down, and at the same time, the oscillations which serve to keep the motor operating, can be stopped, whereby the torpedo will fall nose downward by gravity. The rudders 5 and 6 will serve as a tail in order that the torpedo will dart straight downward and there is a suitable explosive charge 65 within the forward end of the shell 1, which when the torpedo strikes the object, will become detonated.

In launching the torpedo, the controlling member 21 of the motor is moved against the magnet 19, and the stream of motor-controlling oscillations is started by the sending station, the coil 11 being adjusted to select said oscillations, whereby the armature switch 16 sticks to the continually energized magnet 15, thereby maintaining the magnet 19 energized during the flight of the torpedo, and holding the controlling member 21, until the torpedo has reached the desired point, at which time the motor-controlling oscillations are stopped, thereby releasing the operating member 21 which in being moved by the spring 22 will stop the motor. Before the torpedo is launched, and after the motor 3 is started, the two streams of oscillations controlling the rudders 5 and 6 are started, the coils 12 and 13 being adjusted to select the respective oscillations, and the frequency of interruptions being so timed, as to operate the pawls 33 and 53 in synchronism with the motor-driven gears 48. The operator or operators then have perfect control of the torpedo after it is launched, there being three distinct streams of oscillations, which will baffle if not entirely prevent the loss of control of the torpedo by effort on the part of the enemy, by wireless sending stations to intercept the control of the torpedo. The control of the torpedo is, therefore, practically non-interfering, since it is practically impossible for the enemy to ascertain the key to the control after the torpedo has been launched and before it finishes its flight. The flight of the torpedo, although controlled by a wireless sending station or stations, can be signaled to the wireless sending station by observers, in order that the torpedo can be directed accurately to the desired point, which may not be visible from the controlling station.

It is impossible for the motor to be stopped, so long as the motor-controlling oscillations are continued, and the moment that they are stopped, this will release the motor-controlling member 21, withdrawing the armature 20 from the influence of the magnet 19, thus preventing the restoration of the control of the motor, as by an enemy sending station. The planetary gearing for operating each rudder, provides a differential, part of which is motor-driven and part of which is driven by operating means controlled by wireless transmission, the latter part in being varied by varying the wireless oscillations, resulting in the desired movement of the rudder. The vibration of the arms 32 and 54 is such that the vibration cannot be interfered with by stray or interposed oscillations, although the frequency of vibration of said arms can be increased or decreased gradually. This will practically prevent interference, first, because the tuning coils 12 and 13 select certain oscillations only, and second, the interruptions must come in steady interruptions, within certain limits.

Having thus described the invention, what is claimed as new is:

1. A torpedo having propelling means, steering means, a differential mechanism for operating the steering means, a motor operating one part of said differential mechanism, and a wireless equipment having means for operating another part of said mechanism.

2. A torpedo having propelling means, steering means, motor-driven means, a wireless receiving equipment, means operated by said equipment, and a differential operated jointly by the last mentioned and motor-driven means for operating the steering means.

3. A torpedo having propelling means, a motor, steering means, operating means for the steering means connected to said motor, a wireless receiving equipment, and means controlled by said equipment controlling the operating means and operable in synchronism therewith to maintain the steering means in one position and also operable out of synchronism with the operating means so that it operates the steering means.

4. A torpedo having propelling means, steering means, a motor, a differential mechanism connected to the steering means, an operative connection between the motor and one part of said mechanism, a wireless receiving equipment, and vibratory means controlled by said equipment and operating another part of said mechanism to control the operation of the steering means.

5. A torpedo having propelling means, a motor for the propelling means, steering means, a differential mechanism for operating the steering means, one part of said differential operated by the motor, and electrical means for operating another part of said mechanism to actuate the steering means.

6. A torpedo having propelling means including a motor, steering means, a differential mechanism for operating the steering means, comprising a sun gear, an internal gear, and planetary gears between the internal gear and the sun gear, gearing between the planetary gears and the motor, and means for operating the internal gear to actuate the planetary gears to turn the sun gear and operate the steering means.

In testimony that I claim the foregoing as my own, I have hereto affixed my signature in the presence of two witnesses.

CLAUDE H. HILL.

Witnesses:
 LOUISE STERN,
 LORETTA E. GIESING.